United States Patent [19]
Renoux

[11] Patent Number: 5,460,454
[45] Date of Patent: Oct. 24, 1995

[54] BEARING ARRANGEMENT FOR A ROTATING SHAFT IN A WINDSCREEN WIPER DRIVING MECHANISM

[75] Inventor: Pascal Renoux, Chatellerault, France

[73] Assignee: Valeo Systemes d'Essuyage, Montigny-le-Bretonneux, France

[21] Appl. No.: 278,376

[22] Filed: Jul. 20, 1994

[30] Foreign Application Priority Data

Jul. 22, 1993 [FR] France .................... 93 09042

[51] Int. Cl.[6] .................................. F16C 17/02
[52] U.S. Cl. ............................... 384/152; 384/296
[58] Field of Search .................... 384/152, 296, 384/276, 149, 489, 483

[56] References Cited

U.S. PATENT DOCUMENTS 1,861,275  5/1932  Hopkins ................... 384/152
3,359,048  12/1967  Lowe ....................... 384/149

Primary Examiner—Lenard A. Footland
Attorney, Agent, or Firm—Morgan & Finnegan

[57] ABSTRACT

The invention comprises a bearing arrangement for a rotating shaft in a windshield wiper driving mechanism, of the kind comprising a housing having a bore through which the shaft passes and including a bearing sleeve which comprises at least an inner radial flange, a first face of which forms a first shoulder for the axial positioning of a seal provided in the bore which cooperates with the opposite cylindrical surfaces of the bore and of the shaft. According to the invention, one of the ends of the bearing sleeve abuts against a second shoulder formed by the second face of the radial flange, and the internal diameter of the inner radial flange is greater than the internal diameter of the bearing sleeve.

14 Claims, 5 Drawing Sheets

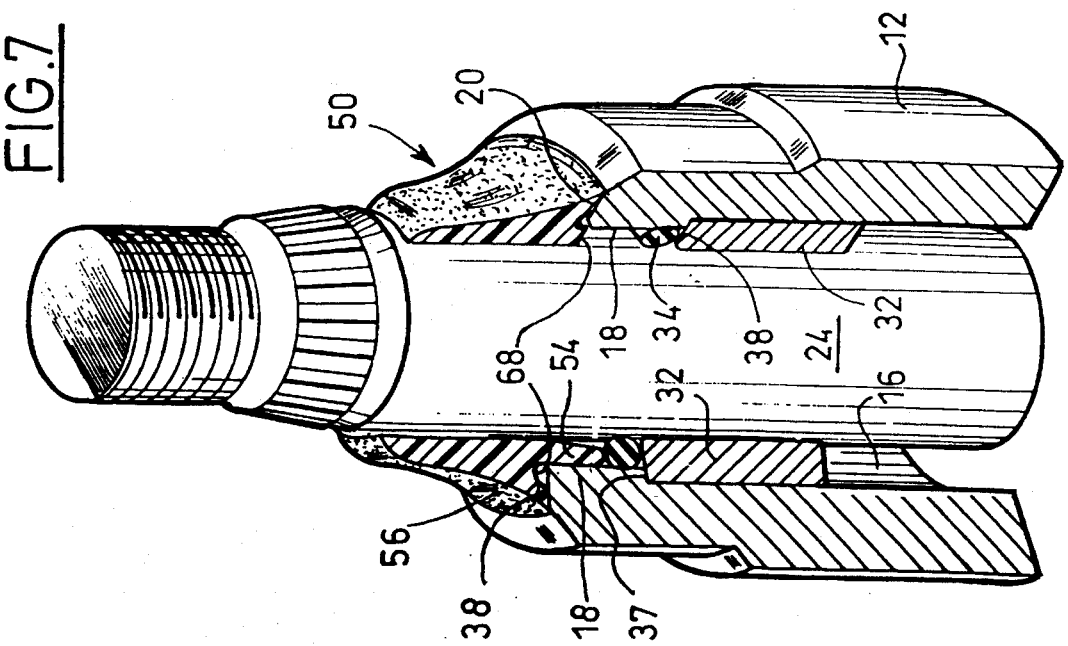
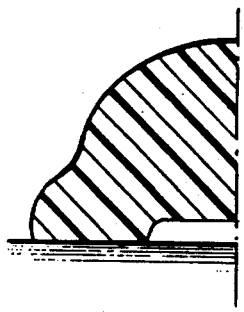
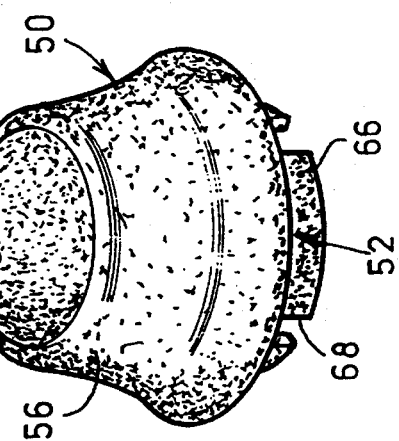
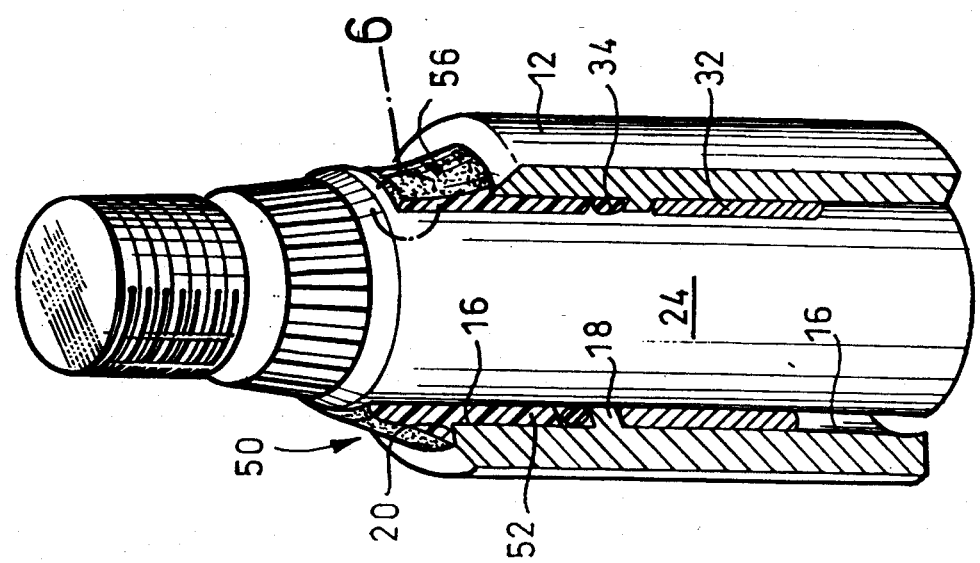

5,460,454

BEARING ARRANGEMENT FOR A ROTATING SHAFT IN A WINDSCREEN WIPER DRIVING MECHANISM

BACKGROUND OF THE INVENTION

The present invention relates to a bearing arrangement for a rotating shaft. More particularly, the invention relates to a bearing arrangement for a shaft belonging to a driving mechanism for a windshield wiper, for example for a driven shaft on one end of which a driving head for a windshield wiper arm is fixed.

One example of such a known bearing arrangement is the kind comprising a bearing housing in which a bore is formed through which the rotating shaft passes with the interposition of at least a bearing sleeve for the rotational mounting of the shaft in the housing, and which comprises at least an inner radial flange, a first face of which forms a first shoulder for the axial positioning of a seal provided in the bore which cooperates with the opposite cylindrical surfaces of the bore and of the rotating shaft.

According to this known arrangement, the seal, which is for example an O-ring seal, is disposed between this shoulder and an end annular face of a bearing sleeve made of bronze. The assembly of components of the bearing is performed by introducing axially the ring seal into the annular seat delimited by the bore and the peripheral surface of the shaft, then by introducing the bearing sleeve which is axially driven into the shaft, and which then immobilises and possibly even crushes the seal in the bottom of the seat formed by the first shoulder. Such a design is therefore not satisfactory as it does not allow the position and state of the seal to be precisely controlled at the end of the assembly operation and because it is difficult to replace the seal.

SUMMARY OF THE INVENTION

To avoid these drawbacks, the invention proposes a bearing arrangement of the kind referred to above, in which one of the ends of the bearing sleeve abuts against a second shoulder provided by the second face of the radial flange.

According to other preferred but non-essential characteristics of the invention:

- the internal diameter of the radial flange is larger than the internal diameter of the bearing sleeve;
- the seal abuts against the first shoulder;
- an end section of the shaft protrudes axially towards the outside beyond an end radial face of the bearing housing and the seal may be positioned by being axially introduced into a cylindrical, annular seat which is delimited by opposite cylindrical surfaces of the bore and of the shaft and which opens into the end radial face of the housing;
- the arrangement comprises means for axially retaining the seal in its annular seat;
- these means comprise a retaining ring comprising a tubular portion which extends axially inside the annular seat and the end face of which forms a stop for the seal;
- the retaining ring comprises a cap-forming portion through which the shaft passes and which axially rests against the end radial face of the housing;
- the retaining ring comprises complementary sealing means cooperating with an opposite portion of the cylindrical surface of the shaft;
- these sealing means comprise a sealing lip made in one piece with the retaining ring and which extends radially beyond the cylindrical surface of the ring to cooperate tightly with the cylindrical surface of the shaft;
- the sealing lip is formed in the vicinity of the free end of the cap-forming portion of the retaining ring;
- the cap-formed portion has a profiled external rotational shape to guide the flow of liquid to the outside the housing;
- the tubular portion of the retaining ring is elastically fitted into the annular seat;
- the tubular portion of the retaining ring is axially slit to form elastically deformable lugs;
- the seal is made in one piece at the free end of the tubular portion of the retaining ring; and
- axial immobilisation means are provided for the retaining ring in relation to the housing.

Other characteristics and advantages of the invention will become apparent from reading the following detailed description, for the understanding of which reference will be made to the attached drawings.

BRIEF DESCRIPTION OF THE DRAWINGS

FIG. 5 is a similar view to that in FIG. 3 illustrating a first refinement of the bearing arrangement illustrated in FIG. 3;

FIG. 6 is a view on a larger scale of a detail of FIG. 5 surrounded by a circle;

FIG. 7 is a similar view to that in FIG. 5 illustrating a refinement of the retaining ring;

FIG. 8 is a perspective view on a larger scale of the retaining ring belonging to the arrangement of FIG. 7;

DETAILED DESCRIPTION OF THE PREFERRED EMBODIMENTS

Figure 1:
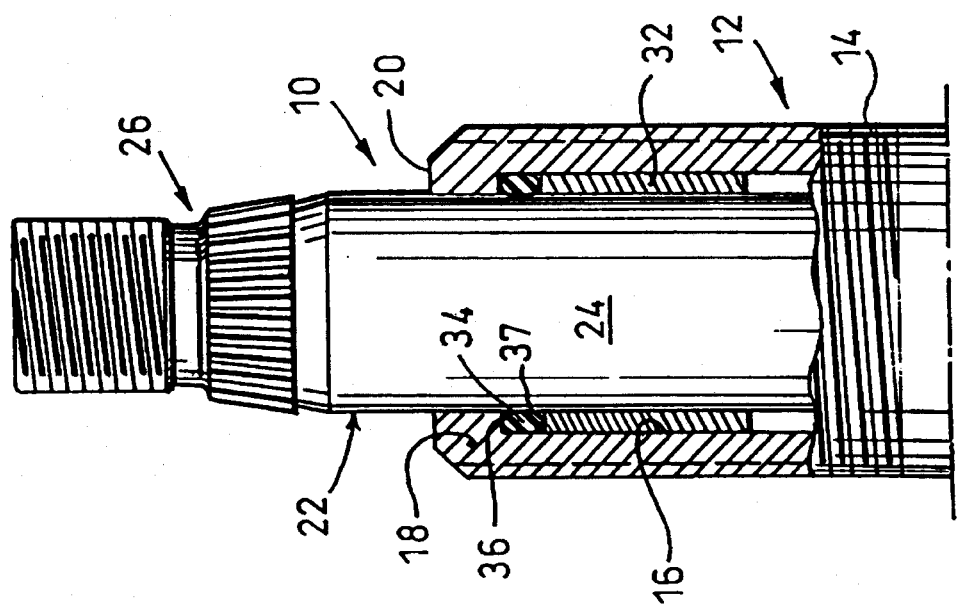
FIG. 1 is a view in partial axial section of the upper part of a bearing arrangement according to the prior art.

The prior art bearing arrangement 10 illustrated in FIG. 1 comprises a bearing housing 12 having a cylindrical, generally tubular shape, the upper part of which comprises a thread 14 in order to allow its assembly, by screwing, for example in a fixed support (not shown) of the bodyshell of a motor vehicle.

The housing 12 comprises an internal bore 16 closed at its upper part by a radial flange 18, through the annular upper face 20 of which the body 22 of a driving shaft 24 belonging to the driving mechanism of a windshield wiper (not shown) passes.

Figure 3:
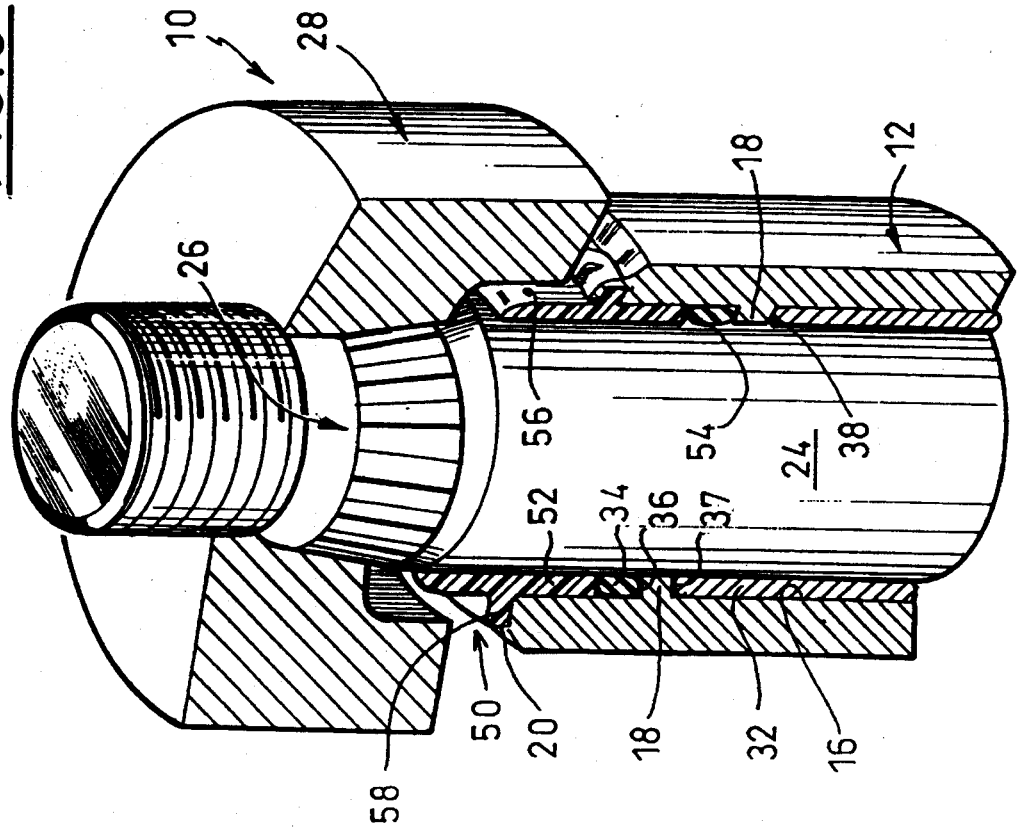
FIG. 3 is an exploded perspective view illustrating a first embodiment of a bearing arrangement in accordance with the teachings of the invention.

The upper end 26 of the shaft 24 comprises known means to enable its connection with a driving head of a windshield wiper arm (not shown) such as for example the driving head, a portion 28 of which is illustrated in FIG. 3.

The shaft 24 is rotatably mounted in the bearing housing 12 with the interposition of at least a bearing sleeve made from bronze 32 which is force-fitted into the bore 16.

The tightness of the bearing is ensured by means of an O-ring seal 34 which is disposed in an annular seat delimited laterally by the opposite cylindrical surfaces of the bore 16 and of the shaft 24 and axially, firstly by a radial shoulder 36 formed by the inner radial face of the flange 18, and secondly by the end annular face 37 of the sleeve 32.

As has been explained above, this arrangement according to the prior art does not enable the axial position of the sleeve 32 in the bore 16 to be precisely controlled and therefore does not permit the final state of the O-ring seal 34 to be controlled at the end of the assembly operation.

The different embodiments and refinements of the invention will now be described with reference to FIGS. 2 to 12, in which components identical or similar to those in the prior art are designated by the same reference numbers.

As can be seen in particular in FIG. 3, the shoulder 36 of the radial flange 18 has the function of a support surface for positioning the O-ring seal 34, whereas the opposite shoulder 38 formed by the other face of the flange 18 henceforth provides a stop surface for the end annular edge 37 of the bearing sleeve 32.

Figure 2:
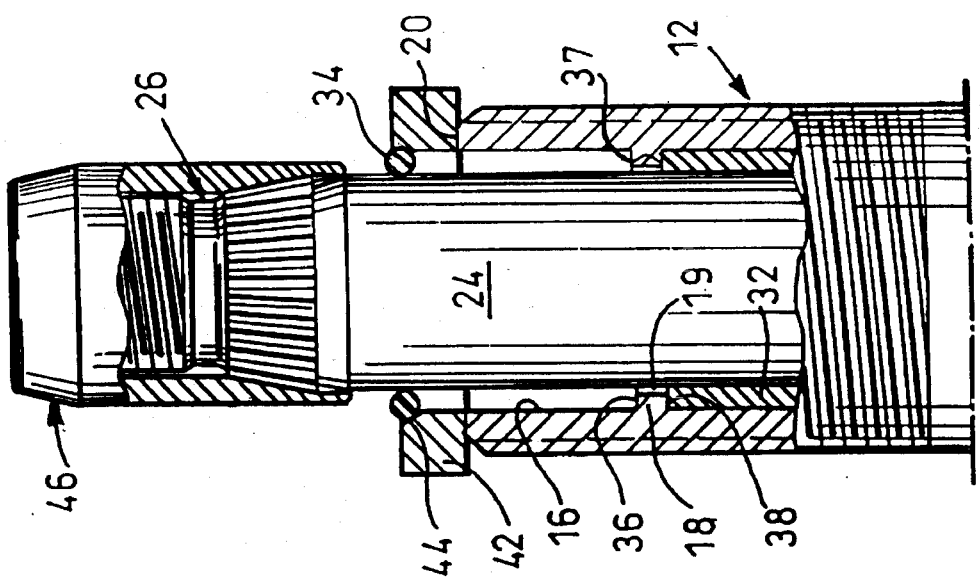
FIG. 2 is a similar view to that of FIG. 1 illustrating the positioning of the seal in a bearing arrangement in accordance with the teachings of the invention.

The positioning of the bearing sleeve 32 in the bore 16 is therefore performed independently of the positioning of the O-ring seal 34 and in fact by the axial introduction of the sleeve, from the bottom upwards when studying FIGS. 2 and 3 until surface 37 comes to abut against shoulder 38.

The positioning of the O-ring seal 34 in the annular seat delimited axially by shoulder 36 is performed, as illustrated in FIG. 2, by axial introduction from the top downwards, when studying this figure.

So that seal 34 is not damaged during its introduction, and especially during its passage into the opening of the annular seat which opens into the end radial face 20 of housing 12, it is possible to use an assembly ring 42 comprising a chamfered introduction edge 44.

The upper part 26 of the shaft 24 is also protected by a protecting sleeve 46 to avoid any damage to the O-ring seal 34.

The O-ring seal 34 is thrust axially, by means of a tool (not represented), until it comes to occupy its normal operating position resting against the shoulder 36.

As is precisely illustrated on FIG. 2, the diameter of the inner cylindrical surface 19 of the radial flange 18 is naturally slightly larger than the internal diameter of the bearing sleeve 32 so as to avoid any mechanical interference with the rotating shaft 24 which is rotationally guided by the bronze sleeve 32.

In order to ensure the secure positioning of the seal 34 in its seat axially delimited by shoulder 36, the arrangement according to the invention comprises a retaining ring 50.

The ring 50 is a component made from plastic material comprising a tubular lower portion 52 which extends inside the annular seat and the axial end annular edge 54 of which forms a stop surface for the seal 34 which is thus held in position between the two opposite surfaces 36 and 54.

The retaining ring 50 also comprises a cap-shaped upper portion 56 which surrounds shaft 24 and which comprises an outer radial collar 58 extending above the end radial annular face 20 of the housing 12 on which it rests.

The retaining ring 50 therefore ensures, by means of its cap-forming upper portion 56, protection of the bearing by preventing penetration of liquid into the bearing.

Figure 4:
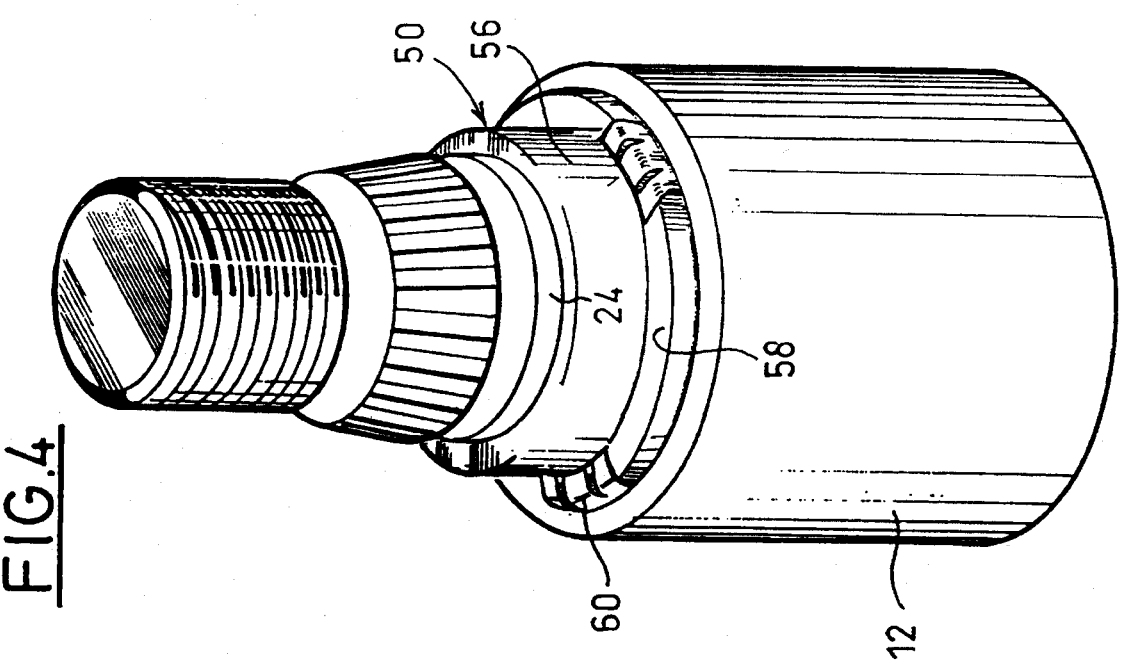
FIG. 4 is a similar view to that in FIG. 3 as an external view and on which the portion of the driving head has been removed.

The immobilisation of the retaining ring 50 in the assembled position in relation to the housing 12 may be ensured for example by the crimping of immobilisation lugs 60 on the radial collar 58, as illustrated in FIGS. 3 and 4.

In order to simplify the representation of the arrangement, thread 14 is not illustrated in FIGS. 3 to 12.

In the refinement illustrated in FIGS. 5 and 6, the cap-forming upper portion 56 of the retaining ring 50 has a thicker profile and it comprises, in the vicinity of its free end edge 62, a complementary radial inner sealing lip 64 cooperating with the opposite portion of the peripheral cylindrical surface of the shaft 24.

In the case of FIG. 5, the tubular lower portion 52 of the retaining ring 50 is force-fitted into the bore 16 so as to immobilise the ring 50 in position on the housing 12.

In the embodiment illustrated in FIGS. 7 and 8, the tubular lower portion 52 of the retaining ring 50 is formed by several elastically deformable lugs 66 delimited by axial slots 68 so as to enable this lower portion 52 to elastically fit into bore 16 as illustrated, in the assembled position, in FIG. 7.

In order to guarantee the elastic function of lugs 66, an annular clearance in the form of half-recess 69 is made in the plane lower face of the upper cap-forming portion 56 of the retaining ring 50 which rests on the end radial face 20 of the housing 12.

In the embodiment illustrated in FIG. 7, the radial flange 18 is formed at the upper end of the housing 12 and its upper radial face forming the shoulder 36 here merges with the end annular radial face 20 of the housing 12.

Therefore the seal 34 is not directly positioned on the shoulder 36 but it rests on the end annular face 37 of the sleeve 32 which itself axially rests against the shoulder 38.

The positioning of the seal 34 in relation to a fixed bearing surface of the housing 12 is therefore performed indirectly here by means of the end annular edge 37 of the sleeve 32.

Figure 9:
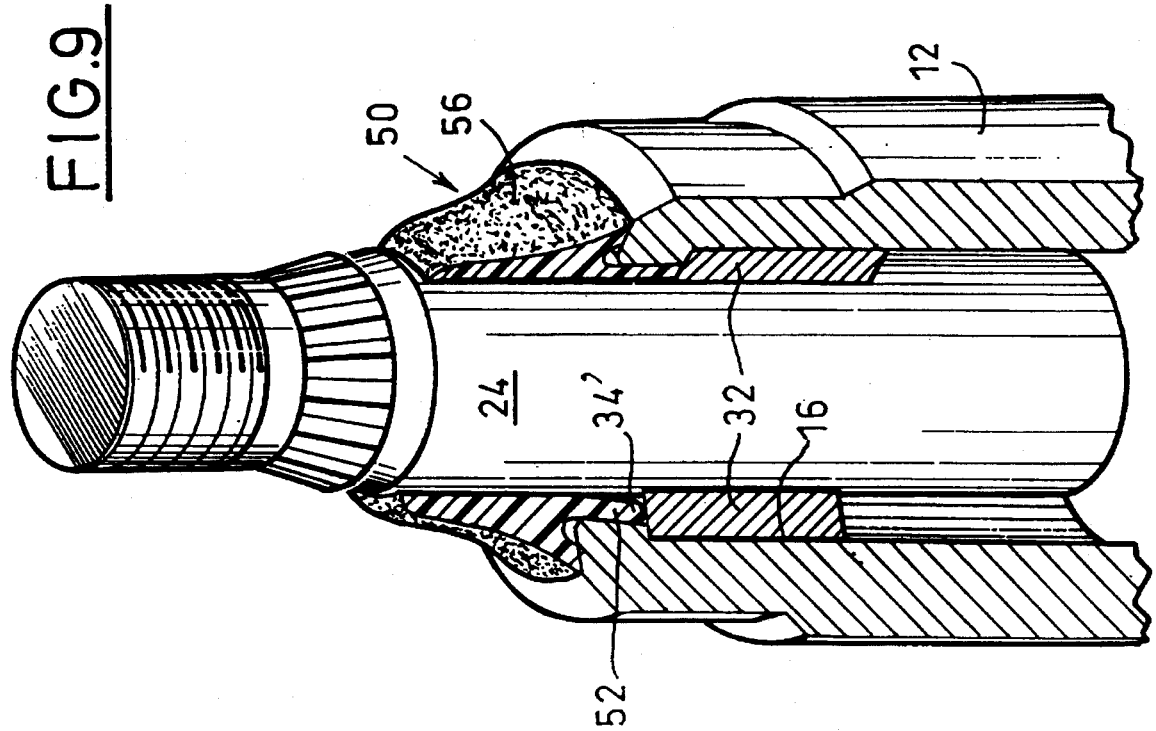
FIG. 9 is a similar view to that in FIG. 3 illustrating another embodiment of a bearing arrangement in accordance with the teachings of the invention.

In relation to the embodiment illustrated in FIG. 7, the refinement represented in FIG. 9 differs therefrom in that the seal 34 is made in one piece in the form of a sealing edge 34' formed at the free end of the tubular portion 52 of the retaining ring 50, the tubular portion 52 here being an unslit complete portion.

Figure 10:
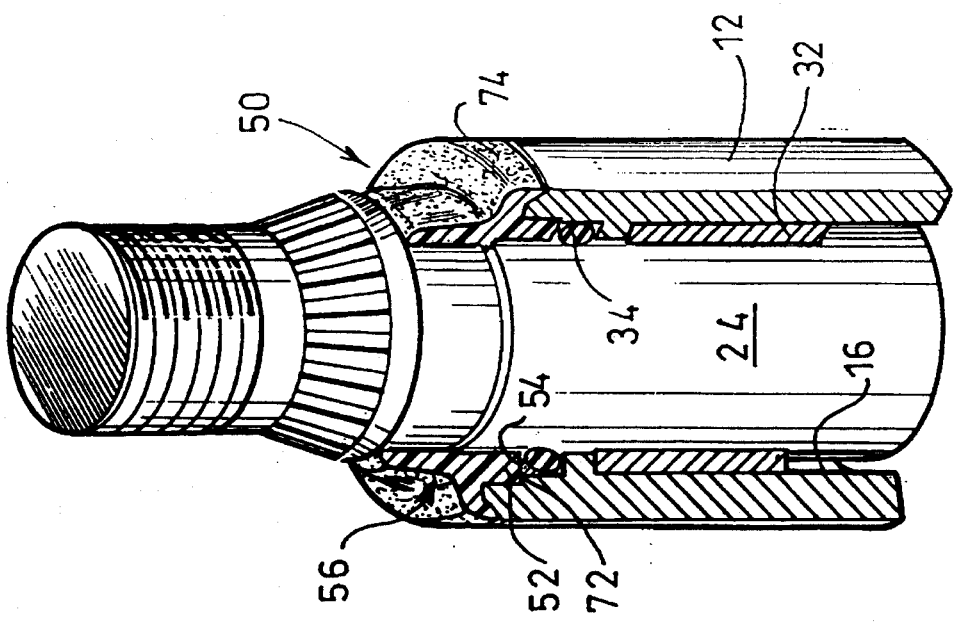
FIG. 10 is a similar view to that in FIG. 5 illustrating a refinement of the bearing arrangement and of the retaining ring.

The arrangement illustrated in FIG. 10 is a refinement of that illustrated in FIG. 5, in which the axial end annular edge 51 of the tubular portion 52 of the retaining ring 50 axially rests against a third radial shoulder 72 of the bore 16, the axial height of the annular seat in which the seal 34 is situated thus being perfectly determined and corresponding to the distance separating shoulders 72 and 36.

It can also be seen on FIG. 10 that the cap-forming upper portion 56 of the retaining ring 50 may comprise a lateral sealing lip 74 which entirely covers the upper end radial face of the housing 12.

Figure 12:
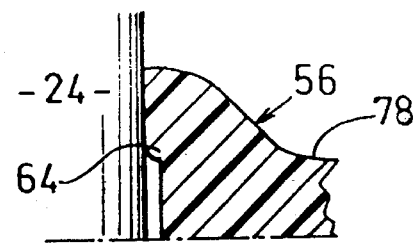
FIG. 12 is a detailed view on a larger scale of the upper portion of the retaining ring encircled in FIG. 11.
Figure 11:
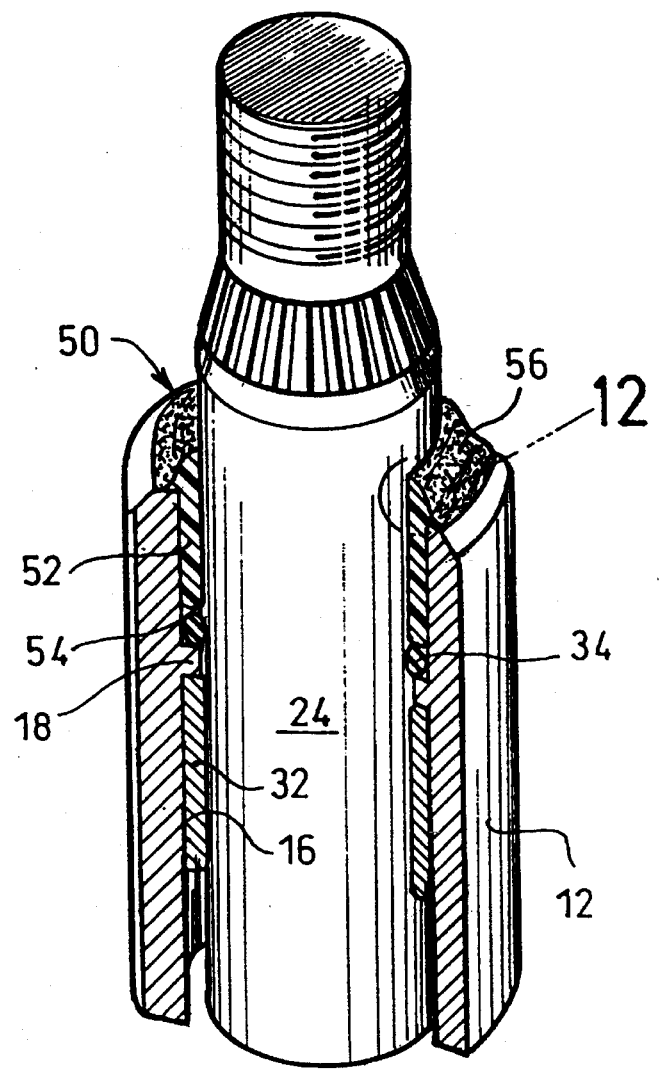
FIG. 11 is a similar view to that in FIG. 5 illustrating a refinement of the retaining ring.

In the embodiment illustrated in FIGS. 1 and 12, which is very similar to that illustrated in FIG. 5, it is noted that the cap-forming upper portion 56 of the retaining ring 50 has a profiled rotational shape 78 which is designed so as to assist the flow of liquid along this cap-forming portion 56 to avoid liquid penetration inside the bore 16 and to channel it directly to the outside of the housing 12.

What is claimed is:

1. A bearing arrangement for a rotating shaft in a drive mechanism for a windshield wiper, comprising a housing having a bore through which the shaft passes, and a bearing sleeve within the bore and which comprises at least an inner radial flange, a first face of which forms a first shoulder for the axial positioning of a seal provided in the bore which cooperates with the opposite cylindrical surfaces of the bore and of the shaft, wherein one of the ends of the bearing sleeve abuts against a second shoulder formed by the second face of the radial flange, and the internal diameter of the inner radial flange is greater than the internal diameter of the bearing sleeve.

2. A bearing arrangement according to claim 1, wherein said seal abuts against the first radial shoulder.

3. A bearing arrangement according to claim 1, wherein an end portion of the shaft protrudes axially beyond an end radial face of the bearing housing, and said seal may be positioned by axial introduction into a cylindrical annular seat which is delimited by opposite cylindrical surfaces of the bore and of the shaft and which opens into the end radial face of the housing.

4. A bearing arrangement according to claim 3, comprising means axially to retain said seal in its annular seat.

5. A bearing arrangement according to claim 4, wherein said means comprise a retaining ring comprising a tubular portion extending inside the annular seat and the end face of which forms a stop for the seal.

6. A bearing arrangement according to claim 5, wherein said retaining ring comprises a cap-forming portion through which the shaft passes and which axially rests against the end radial face of the housing.

7. A bearing arrangement according to claim 6, wherein said cap-shaped portion has a profiled external rotational shape to channel liquid to the outside of the housing.

8. A bearing arrangement according to claim 5, wherein said retaining ring comprises sealing means which cooperate with an opposite portion of the cylindrical surface of the shaft.

9. A bearing arrangement according to claim 8, wherein said sealing means comprise a sealing lip made in one piece with the retaining ring and which extends radially beyond the inner cylindrical surface of the retaining ring to cooperate tightly with the cylindrical surface of the shaft.

10. A bearing arrangement according to claim 9, wherein said retaining ring comprises a cap-forming portion through which the shaft passes and which axially rests against the end radial face of the housing, and said sealing lip is formed in the vicinity of the free end of the cap-forming portion of the retaining ring.

11. A bearing arrangement according to claim 5, wherein said tubular portion of the retaining ring is elastically fitted into the annular seat.

12. A bearing arrangement according to claim 11, wherein said tubular portion of the retaining ring is axially slit to form elastically deformable lugs.

13. A bearing arrangement according to claim 5, wherein said seal is made in one piece at the free end of the tubular portion of the retaining ring.

14. A bearing arrangement according to claim 5, wherein axial immobilisation means are provided for the retaining ring in relation to the housing.

* * * * *